United States Patent [19]

Reynolds

[11] Patent Number: 4,823,553

[45] Date of Patent: Apr. 25, 1989

[54] PLASTIC MASTER CYLINDER WITH FLANGE-SUPPORTING ARMS

[75] Inventor: Desmond H. J. Reynolds, West Midlands, Great Britain

[73] Assignee: Lucas Industries Public Limited Company, Birmingham, England

[21] Appl. No.: 125,143

[22] Filed: Nov. 25, 1987

[30] Foreign Application Priority Data

Nov. 29, 1986 [GB] United Kingdom ............... 8628601

[51] Int. Cl.⁴ .................... B60T 11/22; F16J 10/02
[52] U.S. Cl. ................................ 60/585; 60/533; 92/169.1; 92/169.2
[58] Field of Search ............... 60/533, 585; 92/146, 92/161, 169.1, 169.2, 169.3, 169.4

[56] References Cited

U.S. PATENT DOCUMENTS

| | | | |
|---|---|---|---|
| 3,156,097 | 11/1964 | Brown | 92/169 X |
| 4,505,112 | 3/1985 | Nakamura | 92/161 X |
| 4,590,765 | 5/1986 | Leigh-Monstevens | 60/585 |
| 4,671,065 | 6/1987 | Ishiwata | 60/533 |

FOREIGN PATENT DOCUMENTS 452   1/1983   Japan ........................... 60/585

Primary Examiner—Robert E. Garrett
Assistant Examiner—George Kapsalas
Attorney, Agent, or Firm—Holman & Stern

[57] ABSTRACT

A master cylinder has a pressure cylinder and an outwardly projecting mounting flange mounted thereon by arms extending longitudinally of the cylinder in spaced relationship therewith and being connected to the cylinder at locations remote from the flange outside the area swept by seals carried by a piston. The cylinder, flange and arms are formed as an integral plastics molding.

15 Claims, 3 Drawing Sheets

PLASTIC MASTER CYLINDER WITH FLANGE-SUPPORTING ARMS

BACKGROUND OF THE INVENTION

1. Field of the Invention

This invention relates to a pressure cylinder such as a master cylinder, primarily for use in a vehicle brake or clutch hydraulic system, and particularly to such a cylinder molded from plastics material and having an integral mounting flange.

2. Description of the Prior Art

Because the mounting flange of such a cylinder is usually of significantly greater thickness than the cylinder wall, differential contractions can occur upon cooling after molding of the cylinder, resulting in cylinder bore distortion in the region of the flange. Such distortion can create problems in maintaining an adequate seal between the cylinder internal wall and an internal cooperating piston assembly and can also result in the snagging of the piston and/or its associated seals and possible consequent jamming of the piston assembly within the cylinder.

One attempt to solve this problem consists in mounting the flange by way of an outer cylindrical formation generally co-axial with the surrounding the cylinder proper, the formation being connected to the cylinder at a position beyond the inward limit of piston travel. This arrangement removes any bore distortion resulting from the flange molding to a location at which it does not significantly adversely affect the travel or sealing of the piston assembly. However, a disadvantage of this arrangement is that the overall bulk of the cylinder and consequent installation space required is significantly increased, as are material costs. Moreover, the arrangement can be unacceptable when the mounting flange is required to be adjacent the open cylinder end because the cylindrical portion then required can be excessively long, leading to the possibility of untoward flexing of the cylindrical formation, and consequent movement of the cylinder taking place during operation of the master cylinder.

BRIEF SUMMARY OF THE INVENTION

An object of the present invention is to provide an improved pressure cylinder of plastics material having an integrally molded mounting flange, in which the aforesaid problems are minimized or avoided.

According to the present invention, there is provided a pressure cylinder of plastics material having, in use, a piston slidable therein and carrying a seal, and a generally radially outwardly projecting mounting flange carried and attached to the cylinder by at least one load transmission arm extending generally longitudinally of the external cylinder wall in spaced relationship therewith and being connected to the cylinder wall at a location remote from the flange outside the area swept by the seal during its working travel, the pressure cylinder, flange and arm being formed as an integral molding.

Preferably, a reservoir forms part of the molding and is conveniently attached to the cylinder by way of the arm.

Typically, a plurality of angularly spaced load transmission arms are provided; in a particularly convenient arrangement, two such arms are disposed at diametrically opposed locations. One of the arms may conveniently be connected to the reservoir.

The invention will now be described, by way of example, with reference to the accompanying drawings wherein.

DETAILED DESCRIPTION

Figure 1:
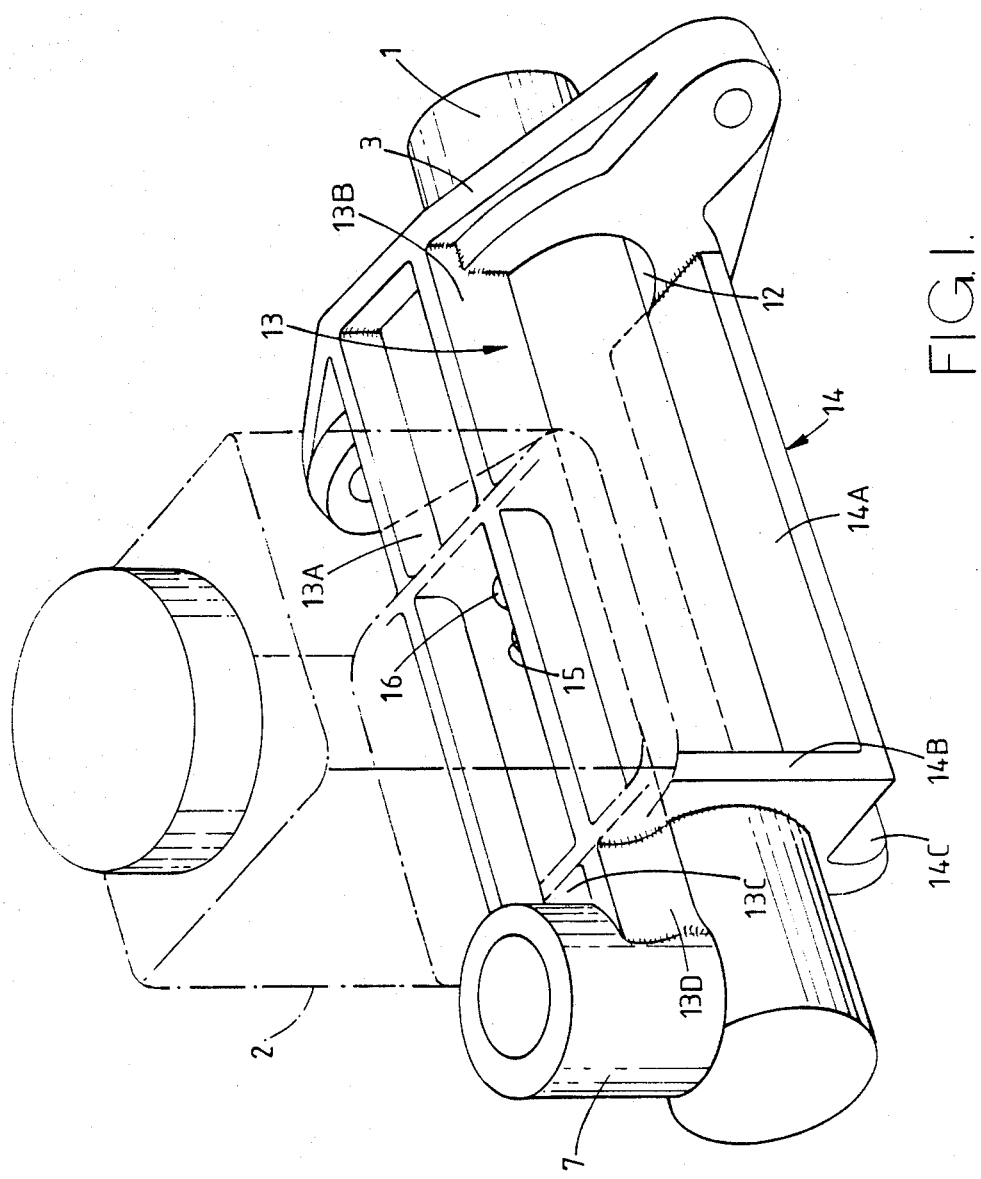
FIG. 1 is a perspective view of one form of the pressure cylinder of the invention with some parts omitted for clarity.
Figure 2:
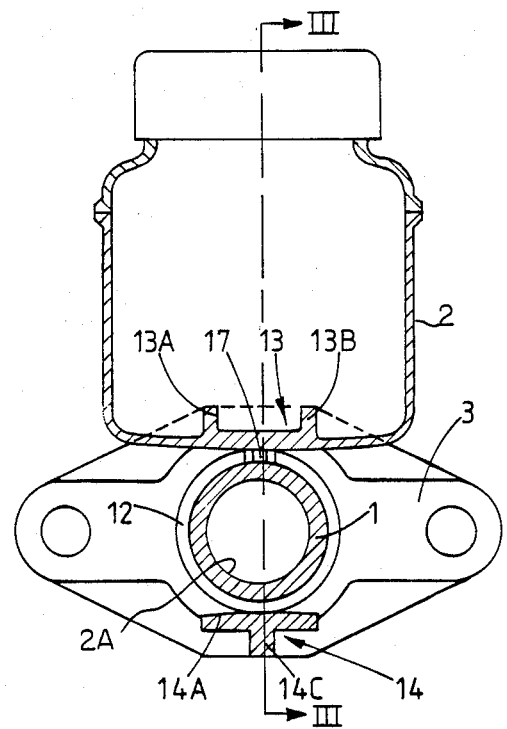
FIG. 2 is a transverse cross-section view of the pressure cylinder illustrated in FIG. 1, taken along line II-V of FIG. 3 with omitted.
Figure 3:
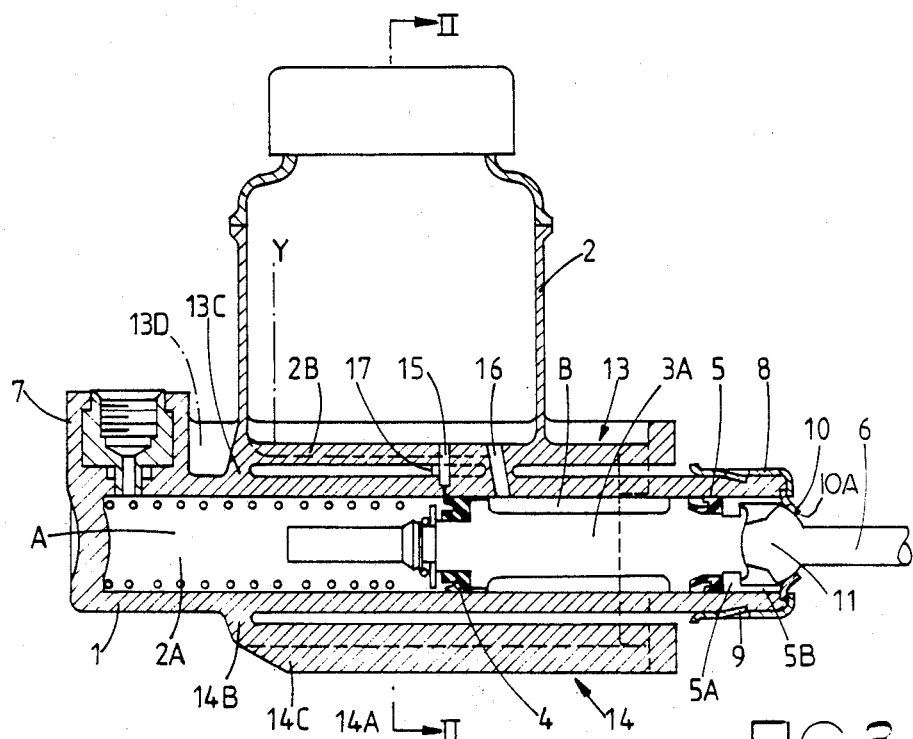
FIG. 3 is a cross-sectional view taken along line III-IV of FIG. 2.

Referring to FIGS. 1 to 3 of the drawings, these illustrated a master cylinder for use in a vehicle hydraulic brake or clutch actuation circuit and including a pressure cylinder 1, a reservoir 2 and mounting flange 3 formed as an integral molding from plastics material. The pressure cylinder 1 has an internal bore 2A within which slides a piston 3A (FIG. 3) slidably reciprocable in the cylinder and carrying a pair of seals 4, 5 on respective end portions thereof. The seal 4 divides the cylinder into high and low pressure chambers A and B and hydraulic fluid in the high pressure chamber A is expelled, upon actuation of the piston by a force input rod 6, through an outlet port formed in a boss 7, which port would be connected, in use, to a vehicle brake in conventional manner. Apart from the seal retained descripted below, the internal components of the pressure cylinder are largely conventional and will not be further described.

The rod 6 is retained in its assembled condition in relation to the cylinder by a retention device 8 in the form of a cup engaged over the open end of the body 1 and having prongs 9 engaging notches in the body. The device 8 retains an arcuate bearing part 10 having an opening 10A engaged by a correspondingly arcuate surface of an enlarged head 11 of the rod 6, the rod thereby being permitted a limited degree of angular movement relative to the longitudinal axis of the cylinder. A seal retainer 5A for the seal 5 is captive in a groove formed in the outer surface of the piston. The seal retainer has a cylindrical skirt 5B extending rearwardly of the piston and acting as a backstop by engaging the bearing part 10. The length of the skirt is chosen so that the piston, when retracted, lies just rearwardly of a recuperation port 15 referred to hereafter. This arrangement enables early closure of the port to take place upon the initiation of piston forward movement.

The flange 3 surrounds the cylinder with clearance at 12 and is carried by upper and lower load transmission arms 13, 14 each connected at one of its ends to the flange 3 and extending lengthwise of the cylinder to be connected to the latter at locations remote from the flange. As will be seen more clearly from FIG. 1 the upper arm 13 includes a pair of parallel ribs 13A, 13B each connected at one end to the flange 3 and extending longitudinally of the cylinder, but spaced radially therefrom, to be connected to the cylinder by a common transverse web 13C. In this particular embodiment, the webs 13C are connected by further web portions 13D to the boss 7 containing the fluid outlet port. The ribs 13A, 13B also carry the reservoir 2, which is melded integrally therewith, the reservoir being placed in communication respectively with the chambers A, B by means of the port 15 and a further port 16 both formed through a further small web 17 (FIG. 2) which interconnects the base 2B of the reservoir with the cylinder 1 over a relatively small area.

The other load transmission arm 14 has a plate-like part 14A connected at one of its ends to the flange 3 and extending longitudinally of the cylinder to be connected to the latter by a generally radially extending web 14B. A reinforcing rib 14C extends longitudinally and generally centrally of the part 14A.

The maximum working travel along the cylinder of the seal 4 is indicated by the line Y in FIG. 2 and it will be seen that the locations of connections between the force transmission arms 13 and 14 are disposed beyond that portion of the cylinder traversed by the seal 4 during its working travel. The piston seals will therefore be seen to work within a portion of the body not subjected to significant deformation by the formation of the connecting webs 13C, 13D, 14B. The small web 17 which accommodates the ports 15, 16, is of small extent and of a thickness comparable with that of the cylinder wall so that its formation does not adversely effect the shape of the cylinder bore. The load transmission arms 13 and 14 transmit actuating forces applied to the cylinder directly to the flange 3, which would normally be mounted, in use, on fixed structure such as a vehicle bulkhead.

Figure 4:
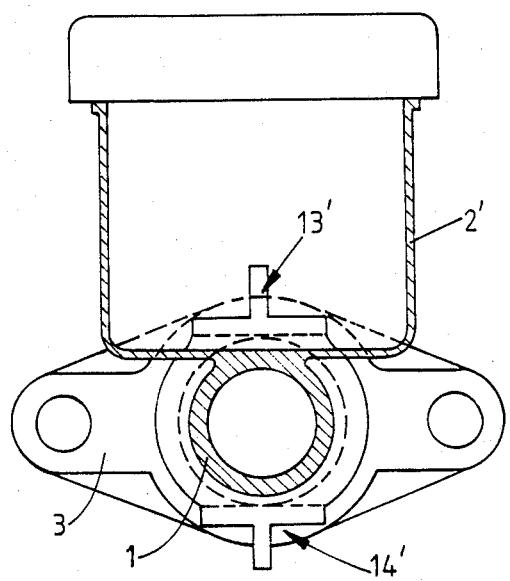
FIGS. 4 and 5 are views similar respectively to FIGS. 2 and 3, illustrating a modified arrangement.
Figure 5:
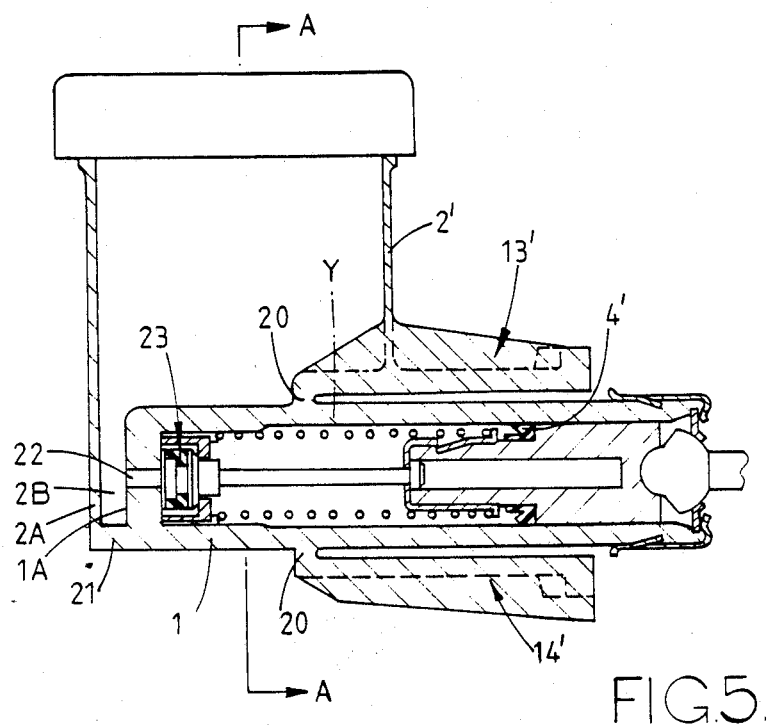

In the alternative embodiment illustrated in FIGS. 4 and 5, the flange 3 is attached to the cylinder 1 by load transmission arms 13', 14', each of generally inverted T-shape and connected to the cylinder wall by webs 20 located beyond the maximum stroke of the piston seal 4', indicated by the line Y. In this embodiment, the reservoir 2' is carried partly by the upper load transmission arm 13' and partly by a web 21 connected directly to the end of the cylinder 1. An inlet port 22 through the end wall of the cylinder is controlled, in use, by a conventional center valve arrangement indicated generally at 23. A wall portion 2A connected to the web 21 is spaced from the closed end 1A of the cylinder and forms a passage 2B through which the reservoir communicates with the cylinder interior via the port 22.

The number and shape of the load transmitting arms, and the angular relationship between the arms, may be varied as desired and each such arm may contain a reinforcing element of metal or other relative rigid material, for additional strength, if required.

It will be seen that the invention provides a simple and effective molded plastics master cylinder having an integral flange which is connected to the cylinder in a manner such that no significant internal cylinder bore deformation occurs as a result of the flange connection and also in a manner which is sufficiently robust to permit actuating forces arising on the cylinder to be transmitted to the fixed support without untoward flexing of the flange connection. The arrangement of the invention also has the advantage that it enables the flange to be located close to the open end to the cylinder bore while at the same time, minimizing the overall bulk and production cost of the cylinder, as compared with some conventional arrangements.

I claim:

1. In a pressure cylinder of plastics material having an internal bore, an external cylinder wall and a mounting flange and including in use a piston reciprocally slidable in the cylinder bore in the direction of the longitudinal axis of the cylinder and a seal on the high pressure side of the piston, the improvement comprising:

a plurality of angularly spaced longitudinal load transmission arms extending substantially longitudinally of and in radially outwardly spaced relationship from the external cylinder wall;

a mounting flange end on each arm; and a substantially radially outwardly projecting mounting flange connected to and supported by said mounting flange ends on said arms;

said arms being connected to the cylinder at a location remote from said mounting flange and beyond the end of the length of working stroke of the piston seal;

said cylinder, flange and arms being an integral molded structure.

2. A pressure cylinder as claimed in claim 1 wherein:
the cylinder has an open end adjacent the end of the length of retracting stroke of the piston; and
said flange is positioned adjacent said open end.

3. A pressure cylinder as claimed in claim 1 wherein:
said plurality of arms comprises two arms at diametrically opposite positions relative to the cylinder.

4. A pressure cylinder as claimed in claim 1 wherein:
each arm comprises a first portion adjacent the cylinder and a second portion extending radially outwardly a greater distance than said first portion.

5. A pressure cylinder as claimed in claim 4 wherein:
said second portion of each arm comprises at least one longitudinal reinforcing rib.

6. A pressure cylinder as claimed in claim 5 wherein:
the cylinder has an open end adjacent the end of the length of retracting stroke of the piston; and
said flange is positioned adjacent said open end.

7. A pressure cylinder as claimed in claim 6 and further comprising:
a reservoir supported on and forming a part of said integral molded structure.

8. A pressure cylinder as claimed in claim 7 wherein:
said reservoir is connected to and supported on at least one of said arms.

9. A pressure cylinder as claimed in claim 8 wherein:
said plurality of arms comprises two arms at diametrically opposite positions relative to the cylinder.

10. A pressure cylinder as claimed in claim 9 wherein:
said plurality of arms comprises an upper arm and a lower arm;
a pair of spaced parallel longitudinal ribs are provided on said upper arm radially outwardly extending therefrom; and
said reservoir is connected to and supported on said pair of parallel ribs.

11. A pressure cylinder as claimed in claim 1 and further comprising:
a reservoir supported on and forming a part of said integral molded structure.

12. A pressure cylinder as claimed in claim 11 wherein:
said reservoir is connected to and supported on at least one of said arms.

13. A pressure cylinder as claimed in claim 12 wherein:
said plurality of arms comprises an upper arm and a lower arm;
a pair of spaced parallel longitudinal ribs are provided on said upper arm radially outwardly extending therefrom; and
said reservoir is connected to and supported on said pair of parallel ribs.

14. A pressure cylinder as claimed in claim 8 wherein:

a web is provided projecting longitudinally from an end region of the cylinder opposite said open end; and said reservoir is supported partly by said web.

15. A pressure cylinder as claimed in claim 14 wherein:

the end of the cylinder opposite said open end is a closed end;

a fluid flow port is provided through said closed end;

said reservoir has a wall portion connected to said web which is spaced longitudinally from said closed end to form a passageway leading from the interior of said reservoir to said port; and a valve means is operatively mounted in said internal bore for opening and closing said port for controlling fluid flow through said port between said internal bore and said reservoir.

* * * * *